US009158291B1

(12) United States Patent
Gahinet (10) Patent No.: US 9,158,291 B1
(45) Date of Patent: Oct. 13, 2015

(54) AUTOMATIC H-INFINITY OPTIMIZATION FOR MULTIVARIABLE CONTROL SYSTEMS

(75) Inventor: Pascal Gahinet, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 773 days.

(21) Appl. No.: 13/456,698

(22) Filed: Apr. 26, 2012

Related U.S. Application Data

(63) Continuation-in-part of application No. 13/026,823, filed on Feb. 14, 2011, now Pat. No. 8,606,375, and a continuation-in-part of application No. 12/893,670, filed on Sep. 29, 2010, now Pat. No. 8,682,453.

(60) Provisional application No. 61/351,650, filed on Jun. 4, 2010, provisional application No. 61/351,658, filed on Jun. 4, 2010, provisional application No. 61/529,538, filed on Aug. 31, 2011.

(51) Int. Cl.
*G05B 13/02* (2006.01)
*G05B 13/04* (2006.01)
*G05B 23/02* (2006.01)
*G05B 17/02* (2006.01)

(52) U.S. Cl.
CPC .............. *G05B 13/041* (2013.01); *G05B 13/04* (2013.01); *G05B 13/042* (2013.01); *G05B 17/02* (2013.01); *G05B 23/0202* (2013.01); *G05B 23/0254* (2013.01)

(58) Field of Classification Search
CPC .... G05B 13/04; G05B 13/041; G05B 13/042; G05B 17/02; G05B 23/0254; G05B 23/0202

USPC .................................................. 700/30, 31, 37
See application file for complete search history.

(56) References Cited

U.S. PATENT DOCUMENTS

| 5,394,322 | A | * | 2/1995 | Hansen | 700/37 |
| 7,158,840 | B2 | * | 1/2007 | Jacques | 700/28 |
| 2003/0139825 | A1 | * | 7/2003 | Lund | 700/29 |
| 2003/0199997 | A1 | * | 10/2003 | Gao | 700/18 |
| 2007/0276512 | A1 | * | 11/2007 | Fan et al. | 700/37 |

(Continued)

OTHER PUBLICATIONS

Iruthayarajan et al., "Evolutionary algorithms based design of multivariable PID controller", Expert Systems with Applications, vol. 36, pp. 9159-9167, 2009.

(Continued)

*Primary Examiner* — Kenneth M Lo
*Assistant Examiner* — Chad Rapp
(74) *Attorney, Agent, or Firm* — Harrity & Harrity, LLP (57) ABSTRACT

H-infinity optimization techniques may be automated for multiple input multiple output (MIMO) control problems. In one implementation, a model may be received, where the model includes a plant portion that models elements that are to be controlled and a controller portion that models elements used to control the plant portion, the plant and controller portions of the model interacting with each other in a MIMO feedback configuration. Identification of tunable elements of the controller portion of the model may also be received. Requirements, relating to constraints of open or closed loop transfer functions of the model may also be received. Values for the adjustable parameters of the tunable elements may be calculated, where the calculation may be performed using non-smooth H-infinity optimization techniques and the calculation may be based on the model, the identification of the tunable elements, and the one or more requirements.

22 Claims, 7 Drawing Sheets

(56) References Cited

U.S. PATENT DOCUMENTS

2012/0035748 A1 2/2012 Gahinet et al.
2012/0177135 A1 7/2012 Gahinet et al.

OTHER PUBLICATIONS

Lewis, "Nonsmooth optimization and robust control", Annual Reviews in Control, vol. 31, pp. 167-177, 2007.
Li et al., "Variational Surface Approximation and Model Selection", Computer Graphics Forum, Proceedings of Pacific Graphics, vol. 28(7) pp. 1-10, 2009.
Rogers, "Proxy Objects", http://newsletters.hagerman.com/newsletters/ebul63-CT.htm, e-vol. 63, pp. 1-3, 2008.
Wolodkin et al., "Autopilot Design using Simulink and the Control System Toolbox", http://www.mathworks.nl/company/newsletters/digest/sept98/aircraft.html, pp. 1-8, 1998.
Zhang et al., "FPGA vs. GPU for Sparse Matrix Vector Multiply", FPT 2009, International Conference on Field-Programmable Technology, pp. 255-262, 2009.
International Search Report and Written Opinion for Application No. PCT/US2011/053974, pp. 1-23, Apr. 3, 2012.
Invitation to Pay Additional Fees for Application No. PCT/US2011/053974, Jan. 2, 2012, 8 pages.
Apkarian et al., "Nonsmooth optimization algorithm for mixed H2/Hinfinity synthesis", Proceedings of the 46$^{th}$ IEEE Conference on Decision and Control, pp. 4110-4115, 2007.
Mammadov et al., "A Nonsmooth Optimization Approach to Hinfinity Synthesis", Proceedings of the 44$^{th}$ IEEE Conference on Decision and Control, and the European Control Conference, pp. 6893-6898, 2005.
Gahinet et al., "Loop Shaping", LMI Control Toolbox, User's Guild, Chapter 6, pp. 6-1-6-24, MathWorks, 1995.
Invitation to Pay Additional Fees for Application No. PCT/US2011/054008, Jan. 5, 2012, 9 pages.
Blight et al., "Practical control law design for aircraft using multivariable techniques," International Journal of Control, vol. 59, No. 1, 1994, pp. 93-137.

\* cited by examiner

```
% Create interface and specify which blocks are tunable:
ST0 = slTunable('rct_helico',{'PI1','PI2','PI3','SOF'});

% Specify the I/O signals of interest for setpoint tracking:
ST0.addIO({'theta-ref','phi-ref','r-ref'},'in')   % setpoint commands
ST0.addIO({'theta','phi','r'},'out')  % corresponding outputs % Identify the control and measurement signals in the model:
ST0.addControl('u');
ST0.addMeasurement('y');

% Create an explicit setpoint tracking requirement for the outer loop
TrackReq = TuningGoal.Tracking({'theta-ref','phi-ref','r-ref'},...
{'theta','phi','r'},2,1e-3);

% Pick the frequency crossover band(a function of the target bandwidth)
wc = [10, 30];

% Tune the controller parameters
ST = ST0.looptune(wc,TrackReq);

% Upload the tuned parameters to Simulink
ST.writeBlockValue()
```

AUTOMATIC H-INFINITY OPTIMIZATION FOR MULTIVARIABLE CONTROL SYSTEMS

RELATED APPLICATIONS

This application claims priority to U.S. Provisional Patent Application No. 61/529,538, filed Aug. 31, 2011, the disclosure of which is incorporated by reference herein. This application is also a continuation-in-part (CIP) of U.S. patent application Ser. No. 13/026,823, filed Feb. 14, 2011, which claims priority to U.S. Provisional Patent Application Nos. 61/351,650, filed Jun. 4, 2010, and 61/351,658, filed Jun. 4, 2010. This application is also a continuation-in-part (CIP) of U.S. patent application Ser. No. 12/893,670, filed Sep. 29, 2010, which claims priority to U.S. Provisional Patent Application Nos. 61/351,650, filed Jun. 4, 2010, and 61/351,658, filed Jun. 4, 2010.

BACKGROUND

H-infinity (H∞) techniques are used in control theory to synthesize controllers to achieve robust performance or stabilization. With H∞ techniques, a control designer may express the control problem as a mathematical optimization problem and then find the controller that solves the optimization problem. H∞ techniques are applicable to multi-loop, multivariable control systems with possible cross-coupling between channels. A disadvantage of classical H∞ techniques is that H∞ controllers can be relatively opaque and/or complex and that recasting the design requirements into a format suitable for H∞ optimization can be challenging for designers.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Implementations described herein may relate to the automation of H∞ optimization techniques. Multivariable control problems, such as multiple input multiple output (MIMO) control problems, may be formulated, with relatively little guidance by a designer, into a standard form. H∞ optimization may be automatically applied to the standard form.

In one implementation, a technical computing environment (TCE) may be used to design models of control systems. The automated H∞ optimization techniques, as described herein, may include interfaces to the TCE to facilitate the application of the H∞ techniques to the models designed with the TCE.

DEFINITIONS

A Technical Computing Environment(TCE) may include any hardware and/or software based logic that provides a computing environment that allows users to perform tasks related to disciplines, such as, but not limited to, mathematics, science, engineering, medicine, and business. The TCE may include text-based facilities (e.g., MATLAB® software), a graphically-based environment (e.g., Simulink® software, Stateflow® software, SimEvents™ software, etc., by The MathWorks, Inc.; VisSim by Visual Solutions; LabView® by National Instruments; etc.), or another type of environment, such as a hybrid environment that includes one or more of the above-referenced text-based environments and one or more of the above-referenced graphically-based environments.

The TCE may be integrated with or operate in conjunction with a graphical modeling environment, which may provide graphical tools for constructing models, systems, or processes. The TCE may include additional tools, such as tools designed to convert a model into an alternate representation, such as source computer code, compiled computer code, or a hardware description (e.g., a description of a circuit layout). In one implementation, the TCE may provide this ability using toolboxes (e.g., toolboxes for signal processing, image processing, color manipulation, data plotting, parallel processing, etc.). The toolboxes may provide a graphical or textual interface for the users. In another implementation, the TCE may provide these functions as block sets. In still another implementation, the TCE may provide these functions in another way.

Models generated with the TCE may be, for example, models of a physical system, a computing system (e.g., a distributed computing system), an engineered system, an embedded system, a biological system, a chemical system, etc.

System Description

Figure 1:
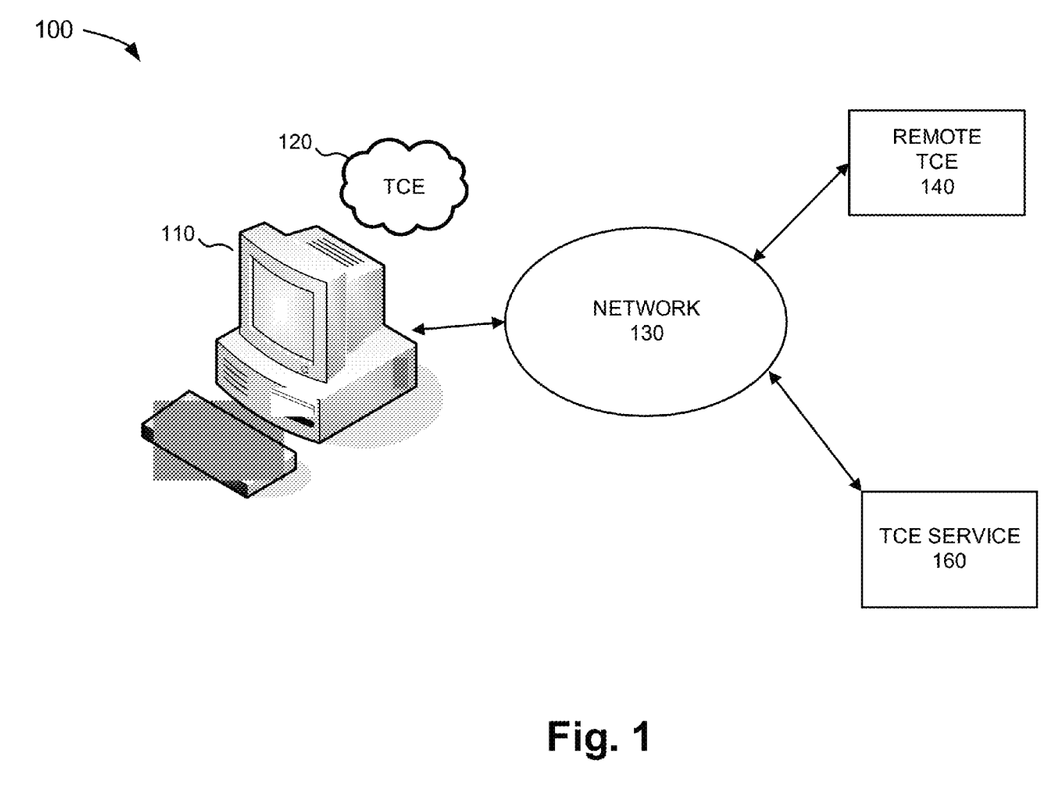
FIG. 1 is diagram of an example system in which concepts described herein may be implemented.

FIG. 1 is diagram of an example system 100 in which concepts described herein may be implemented. System 100 may include a personal computer or workstation 110. Workstation 110 may execute a TCE 120 that presents a user with an interface that enables design, analysis, and generation of, for example, technical applications, engineered systems, and business applications. For example, TCE 120 may provide a numerical and/or symbolic computing environment that allows for matrix manipulation, plotting of functions and data, implementation of algorithms, creation of user interfaces, and/or interfacing with programs in other languages. TCE 120 may particularly include a graphical and/or textual modeling component and a component to convert graphic models into other forms, such as computer source code (e.g., C++ code) or hardware descriptions (e.g., a description of an electronic circuit). In one implementation, the graphical modeling capability of TCE 120 may also include state-based, time-based, event-based, and/or dataflow-based software to facilitate construction of graphical models based on state, time, event, and/or dataflow diagrams and/or charts. For example, Stateflow software may generally allow a user to describe complex logic in a natural form using state charts or flow diagrams.

Workstation 110 may operate as a single detached computing device. Alternatively, workstation 110 may be connected to a network 130, such as a local area network (LAN) or a wide area network (WAN), such as the Internet. When workstation 110 is connected to a network, TCE 120 may be executed by multiple networked computing devices or by one or more remote computing devices. In such an implementation, TCE 120 may be executed in a distributed manner, such as by executing on multiple computing devices simultaneously. Additionally, in some implementations, TCE 120 may be executed over network 130 in a client-server relationship. For example, workstation 110 may act as a client that communicates with, using a web browser, a server that stores and potentially executes substantive elements of TCE 120.

As shown in FIG. 1, system 100 may include a remote TCE 140 (e.g., a remotely located computing device running a TCE) and/or a TCE service 160. TCE service 160 may include a server computing device that provides a TCE as a remote service. For instance, a TCE may be provided as a web service, a service provided over a computing cloud, etc. For example, a web service may provide access to one or more programs provided by TCE service 160.

In one implementation, models created with TCE 120 may include a model of a control system (called a controller herein), such as a system used to control a plant, a vehicle, an aircraft, or another entity or process. The controlled entity may be generically referred to as a plant herein. The system may include one or more controllers, such as proportional-integral-derivative (PID) controllers, that act as controllers for the plant. Each controller may be associated with one or more parameters that are used to tune the controller. TCE 120 may be used to optimize values for the parameters of the controllers and/or the plant.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more other tasks described as being performed by one or more other components of system 100.

Figure 2:
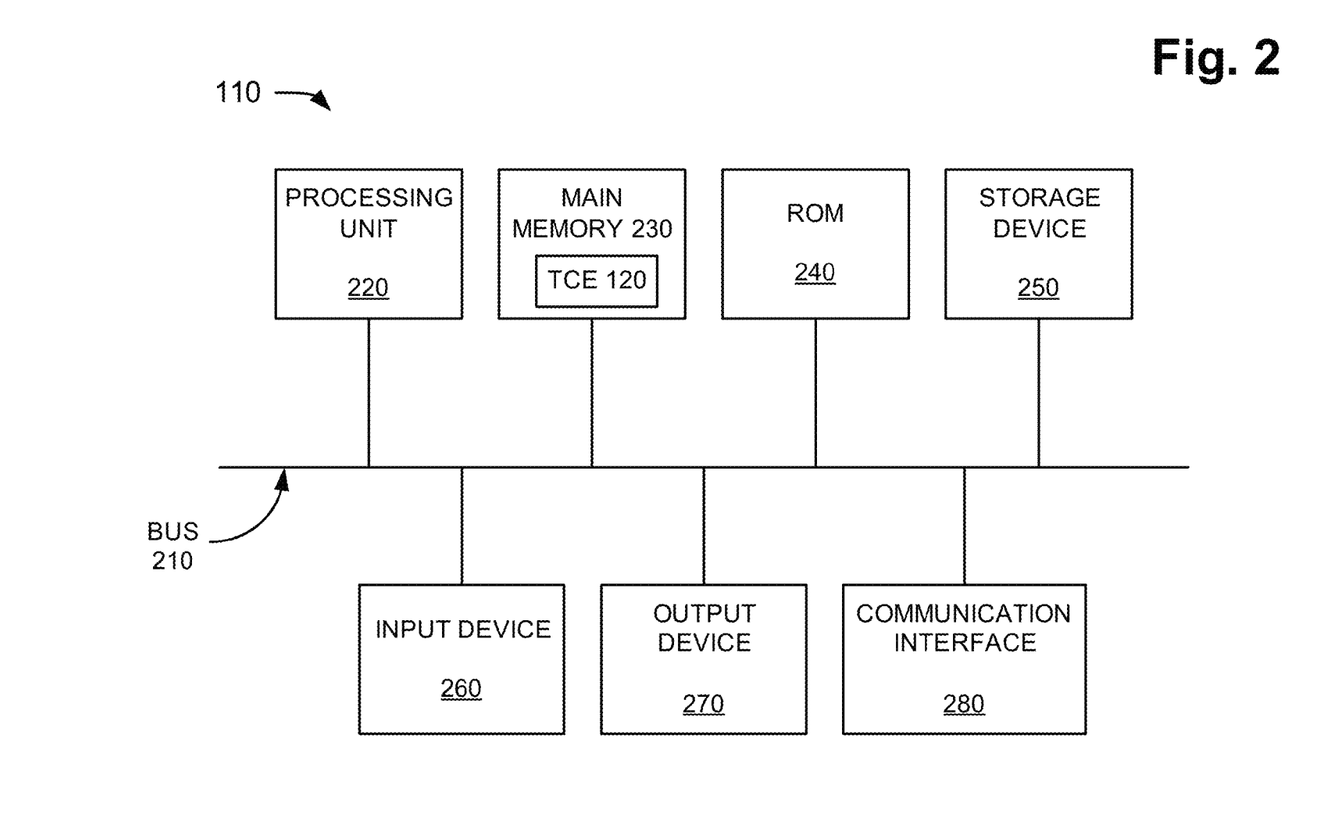
FIG. 2 is a diagram of an example device that may correspond to a device shown in FIG. 1.

FIG. 2 is a diagram of an example device 200 that may correspond to workstation 110, a remote device running remote TCE 140, or a server providing TCE service 160. In one example, workstation 110, the remote device, and/or the server may include one or more devices 200 and/or components of device 200. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, microprocessors, and/or other types of processing logic that may interpret and execute instructions. Main memory 230 may include a random access memory (RAM) or another type of dynamic storage device that may store information and instructions for execution by processing unit 220 (e.g., instructions implementing TCE 120). ROM 240 may include a ROM device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to device 200, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a printer, a speaker, etc. In the case of a display, the display may be a touch screen display that acts as both an input and an output device. Input device 260 and/or output device 270 may be haptic type devices, such as joysticks or other devices based on touch.

Communication interface 280 may include any transceiver-like mechanism that enables device 200 to communicate with other devices and/or systems. For example, communication interface 280 may include mechanisms for communicating with another device or system via a network.

As will be described in detail below, device 200 may perform certain operations in response to processing unit 220 executing software instructions contained in a computer-readable medium, such as main memory 230. For instance, device 200 may implement TCE 120 by executing software instructions from main memory 230. A computer-readable medium may be defined as a non-transitory memory device, where the memory device may include a number of physically, possible distributed, memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Tuning of Control Systems Using H∞ Optimization

In general, a control system may be modeled as one or more elements in which some of the elements may include tunable elements. There may be infinitely many possible control system architectures. Consistent with aspects described herein, the system may be conceptualized as a standard form in which a first portion of the model represents elements that are to be controlled and a second portion of the model represents elements that control the first portion. The first portion of the model will be referred to as the "plant" herein and the second portion will be referred to as the "controller."

Figure 3:
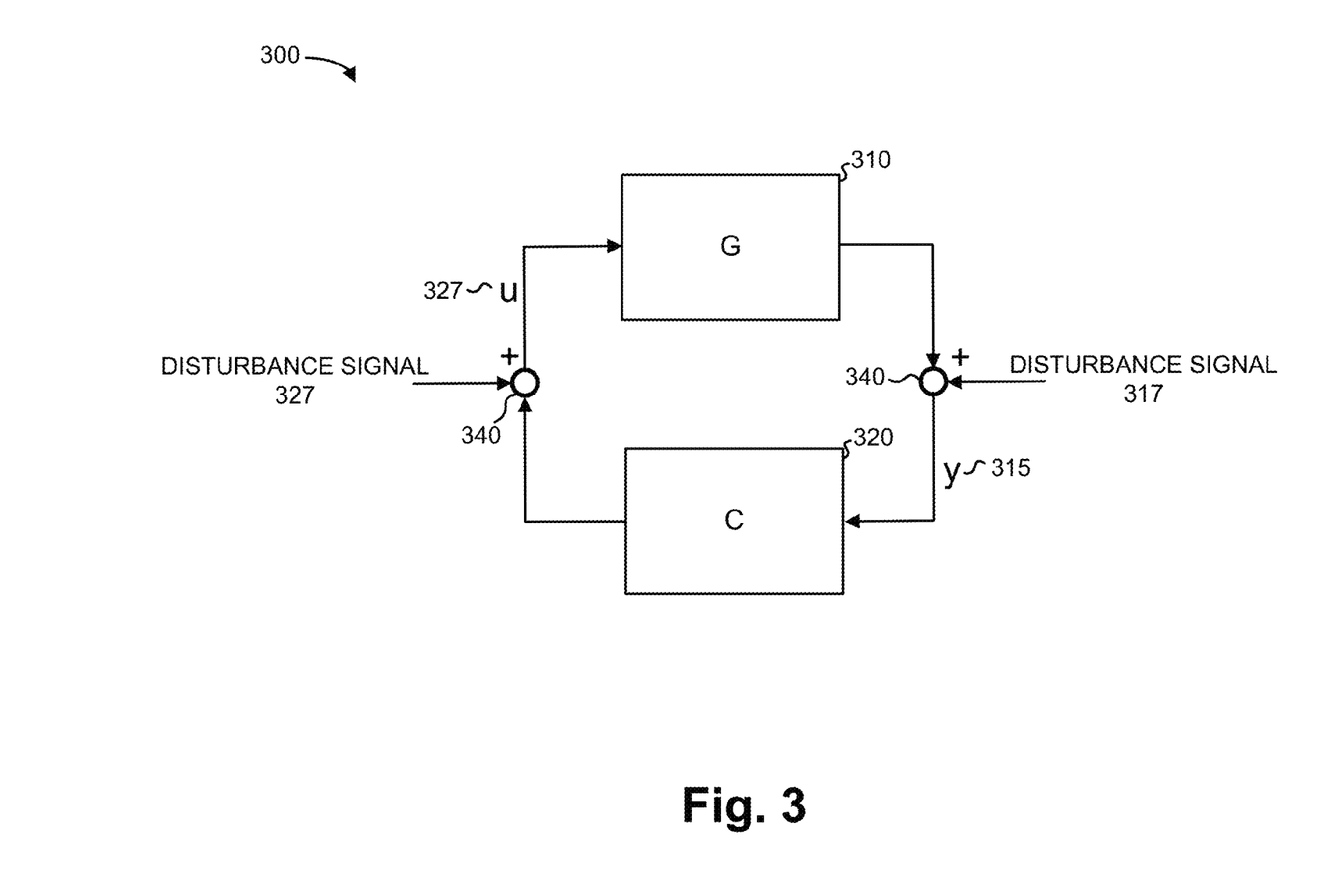
FIG. 3 is a diagram illustrating a standard form of a MIMO feedback loop consisting of a plant model G and a controller C whose structure and complexity are fixed or constrained.

FIG. 3 is a diagram illustrating a standard form for the aforementioned control system, 300, modeled as a plant (G) 310 and a controller (C) 320 in which system 300 is in the form of a MIMO loop. Plant 310 may represent the elements that are being controlled by controller 320. Plant 310 may include, for example, a physical environment to be controlled or the actuators that are used to physically interact with this environment. Examples of possible environments that may be modeled in plant 310 include motors, robots, airframes, machinery, etc. Examples of possible actuators that may be modeled in plant 310 include valves, pistons, relays, piezoelectric actuators, electrical motors, linear actuators, etc. Controller 320 may represent elements that control plant 310 by taking available measurements of the plant current behavior and issuing commands to the various actuators to alter or correct this behavior Controller 320 may particularly include tunable elements, where each tunable element includes one or more parameters that can be set to modify the operation of controller 320. Each tunable element, of controller 320, can be assumed to be linear time invariant and to have some prescribed structure. In some implementations, plant 310 may also include tunable elements.

Plant 310 may output a measurement signal y 315 (which may be a vector). Measurement signal 315 may represent sensed or measured values from plant 310. For example, measurement signal 315 may represent flow volume, temperature measurements, speed measurements, or other values. Measurement signal 315 may potentially be modified by measurement disturbance signal 317, which may represent, for example, errors or disturbances to measurement signal 315. Measurement signal 315 may represent the feedback values for system 300.

Controller 320 may output a control signal u 325 (which may be a vector). Control signal 325 may represent the plant control inputs that are determined by controller 320 and that manipulate elements in plant 310. For example, control signal 325 may represent one or more signals used to drive actuators in plant 310. The actuators may control the position of a control valve, the power supplied to a heating element, or one or more other elements in plant 310. Control signal 325 may potentially be modified by control disturbance signal 327, which may represent, for example, errors or disturbances to control signal 325.

In the standard plant-controller form shown in FIG. 3, the demarcation points between plant 310 and controller 320 may be referred to as the boundary points.

Figure 4:
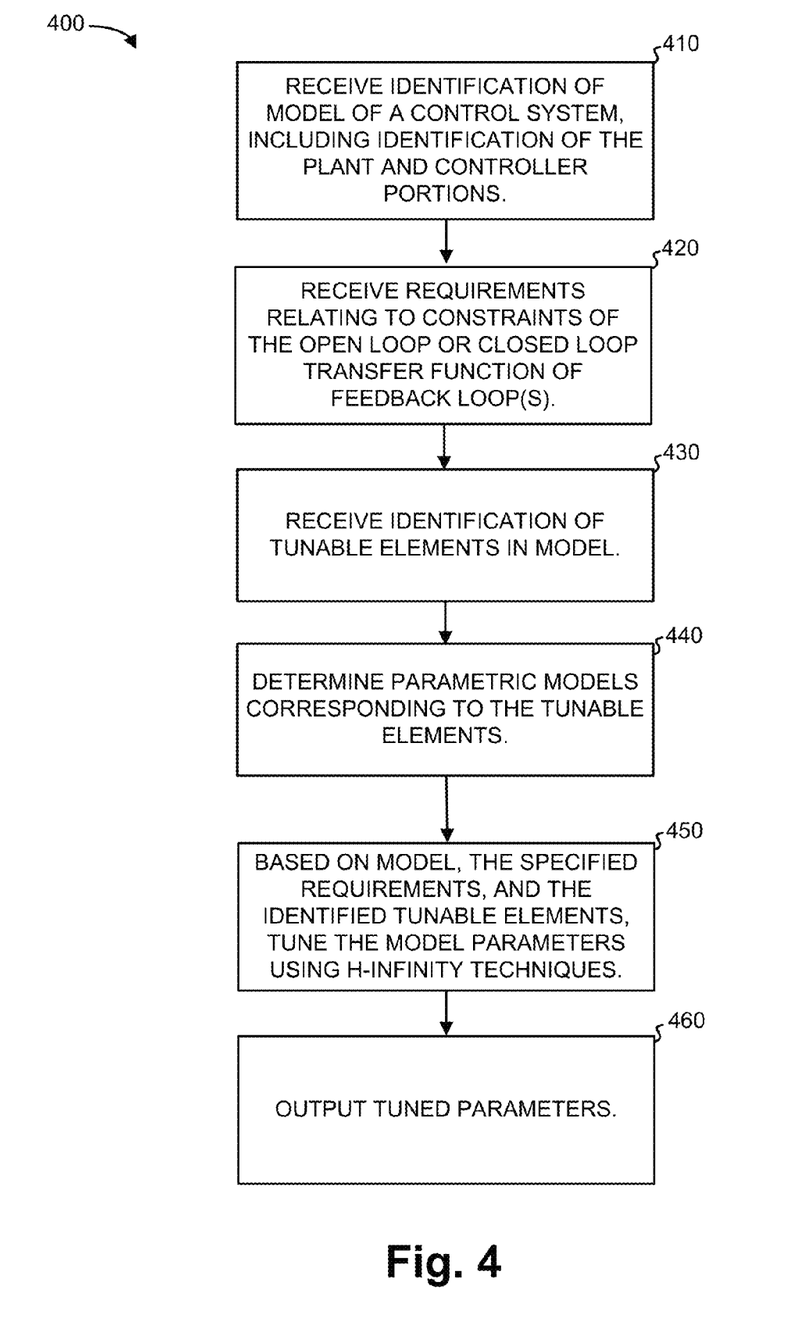
FIG. 4 is a flow chart illustrating an example process for tuning the system of FIG. 3 using H∞ optimization techniques.

FIG. 4 is a flow chart illustrating an example process 400 for tuning system 300 using Hoc optimization techniques. Process 400 may be performed by TCE 120, such as TCE 120 executing on a workstation 110.

Process 400 may include receiving identification of a model of a control system, including identification of the plant 310 and controller 320 portions of the model (block 410). In one implementation, a user may create a model of a control system using software tools, such as TCE 120. The model may be created in a graphical environment in which blocks, representing functionality and/or data, are graphically connected to form the model. Alternatively or additionally, the model may be created in a textual environment. In some implementations, TCE 120 may include both graphical and textual interfaces that may be interchangeably used. For example, a user may edit the functionality of blocks, included in a block library of TCE 120, by editing code corresponding to the blocks in a text editor, and may connect the blocks to create a model in a graphical environment.

The plant 310 and controller 320 portions of the model may be identified in a number of different of ways. For example, a user may separately create a model for plant 310 and a model for controller 320. In this situation, the user may input the models to TCE 120 to separately identify (e.g., by identifying a file) plant 310 to controller 320. The boundary points between plant 310 and controller 320 may correspond to the interfaces between the identified plant 310 and controller 320 portions.

In an alternative technique for identifying plant 310 and controller 320 portions of the model, a single model, including both plant and controller elements, may be created or input by the user. The user may then specify one or more signals that define measurement signal 315 and one or more signals that define control signal 325. For example, the signals in the model may be labeled. The user may input, into TCE 120, a list of labels that correspond to measurement signal 315 and a list of signals that correspond to control signal 325. In this manner, the boundaries between plant 310 portion of the model and the controller 320 portion of the model may be received by TCE 120.

Process 400 may further include receiving requirements relating to constraints of the open or closed loop transfer function of the feedback loop(s) of the model (block 420). The feedback loops may be of the form of the MIMO feedback loop illustrated in FIG. 3. The requirements may be received from a user and may be expressed in a number of different ways. For example, in one implementation, a frequency crossover band may be received from the user, where the frequency crossover band specifies a frequency range that marks a transition between actively controlled and uncontrolled open loop frequencies of the model. In single-loop control systems the crossover range can be specified as a single frequency. In multi-loop control systems, each loop may have a different gain crossover frequency, so the transition region may be specified as an interval rather than a single frequency. As another example, the requirements relating to the constraints may alternatively or additionally be received as a setpoint tracking goal and/or a disturbance rejection goal. A setpoint tracking goal, for instance, may refer to how closely a measured value is to track a potentially changing setpoint value. A disturbance rejection goal, for instance, may refer to how disturbance signal 327 is to be rejected to force a measured value back toward a desired setpoint. As another example of requirements that may be received from a user, the user may explicitly identify the shape or gain function of the open loop response of a feedback loop. In alternative or additional implementations, other specifications relating to the constraints of the open or closed loop transfer function may be received.

In one implementation, the requirements received in block 420 may be relatively straightforward requirements. For example, because the frequency crossover band may be a common requirement for control systems, a designer may advantageously be able to optimize the tunable parameters of controller 320 even when the designer is not an expert in Hoc optimization techniques.

Process 400 may further include receiving identification of tunable elements in the model (block 430). The tunable elements in the model, as previously discussed, may be elements of the model that are part of controller 320 and that include parameters that may be changed (tuned) to optimize operation of controller 320 with respect to the portion of the model that defines plant 310. The tunable elements may include, for example, PID controllers, gain or amplifier elements, fixed-order transfer function elements, and/or other elements. The user may identify, such as via a graphical or textual interface, which of the elements of the model are tunable elements. In some implementations, plant 310 may also include tunable elements.

Process 400 may include determining parametric models corresponding to the tunable elements (block 440). The potential tunable elements may include a wide range of possible structures, from simple gains and PIDs to more complex lead-lag and observer-based controllers. In one implementation, TCE 120 may provide a library of blocks that represent different types of tunable control elements that are already parametric models. In this case, building parametric models corresponding to the tunable elements may be a trivial operation. The library may include PIDs that are parameterized by four scalars and other types of tunable control elements. Table I, below, summarizes possible parameterizations of some common control elements, such as a gain block, a proportional integral derivative (PID) block, a fixed-order transfer function block, and a fixed-order state-space block.

TABLE I

| Tunable control element | Parameterization |
| --- | --- |
| Gain block | Every entry of the gain matrix is a parameter. |
| PID block $B(s) = K_p + \frac{K_i}{s} + \frac{K_d s}{1 + T_f s}$ | $K_p$, $K_i$, $K_d$, and $T_f$ are the parameters. |
| Fixed-order transfer function block $B(s) = \frac{b_m s^m + \cdots + b_0}{s^n + a_{n-1} s^{n-1} + \cdots + a_0}$ | The numerator and denominator coefficients are the parameters. |
| Fixed-order state-space block $B(s) \begin{cases} \dot{x} = Ax + Bu \\ y = Cx + Du \end{cases}$ | The entries of the A, B, C, D matrices are the parameters. By default A may be restricted to be tri-diagonal, which is fully general and reduces the number of parameters needed. |

In some implementations, TCE 120 may provide and/or use software-based tools to allow users to create custom parameterizations of elements by writing expressions involving basic parameters. For example, an example tool may allow a user to create tunable blocks with additional structures, such as, but not limited to:

a low-pass filter a/(s+a) parameterized by the real valuea; and a state-space controller in observer form:

$$\begin{cases} \dot{x} = Ax + Bu + L(y - Cx - Dy) \\ u = -Kx \end{cases},$$

where the parameters K and L may be the gain matrices.

Referring back to FIG. 4, process 400 may further include, based on the model, the specified requirements, and the identified tunable elements, tuning the model parameters using H∞ techniques (block 450). Tuning of the model parameters may be performed by TCE 120. TCE 120 may combine the received constraints and optimize the received constraints using H∞ tuning methods for fixed structure controllers. One example of an appropriate tuning method is the HINFSTRUCT solver, available from The MathWorks.

Tuning the model parameters may be based on the following objectives.

Performance. The feedback loops of the model may have high gain at low frequencies to reject disturbances and to follow setpoint changes.

Rolloff. The feedback loops of the model may have low gain at high frequencies to guard against unmodeled dynamics and measurement noise.

Robust Stability. The feedback loops should be stable and have enough cushion to sustain typical amounts of gain and phase variations at the inputs and outputs to plant 310 (e.g., due to imperfect sensors and actuators and inaccuracies in the model of the controlled environment).

The robust stability condition (third condition) uses a multivariable concept of stability margins that provides robust stability against simultaneous gain and phase variations in plant I/O channels. This condition also provides automatic scaling of input/outputs of controller 320. Automatic scaling of the input/outputs of controller 320 may be particularly important to constrain the gain of the MIMO transfer functions of the feedback loops and correct situations where cross-coupling effects are very large in some channels and very small in others due to poor choices of units or of the location where these transfer functions are measured. When the requirements for the constraints of the loop transfer functions are expressed as a frequency crossover band, the robust stability condition, as it relates to the calculation of the tunable parameters, may be expressed as $$\mu_\Delta(X(s)) < \frac{1}{\alpha}, \, X(s) = (I + L)(I - L)^{-1}, \, L = \begin{bmatrix} 0 & G \\ C & 0 \end{bmatrix}$$

where G and C are matrices representing plant 310 and controller 320 portions, respectively, of the model. Also, $\mu_\Delta(.)$ may represent the structured singular value for diagonal block structures of the model, and a may represent a constant selected based on desired gain and phase margins. Example values for a that correspond to particular gain in phase margins are given in Table II, below.

TABLE II

| A | Phase Margin | Gain Margin |
| --- | --- | --- |
| 0.4142 | 45 deg | ±7.65 dB |
| 0.5773 | 60 deg | ±11.43 dB |

For tractability, the expression above can be simplified to the condition $$\min_{D} \omega \in \max_{[\omega_1, \omega_2]} \|D^{-1} X(j\omega) D\| < 1/\alpha$$

where the diagonal scaling D is tuned along with the controller parameters, and $[\omega_1, \omega_2]$ represents some interval including the frequency crossover region. The scaling $$D = \begin{bmatrix} D_0 & 0 \\ 0 & D_i \end{bmatrix}$$

may be equivalent to input/output scaling of plant 310, $G \rightarrow D_0^{-1} G D_i$, and may be interpreted as balancing intensities of measurement signal 315 and control signal 325 and correct imbalances due, for example, to poor choice of units for the input/output signals.

The performance and rolloff conditions (the first and second conditions listed above) may be defined with respect to the frequency crossover band. These conditions may amount to imposing integral action at low frequencies and rolloff at high frequencies (e.g., −20 dB/decade). The high-to-low crossover may occur in the frequency crossover interval, $w_c=$ $[\omega_{Low}, \omega_{High}]$. The tunable parameters may be adjusted to enforce constraints based on the expressions $$\left\| \begin{bmatrix} W_{perf} S_{i,D} \\ W_{ro}(I - S_{i,D}) \end{bmatrix} \right\|_{\infty} < 1, \text{ when } ny >= nu$$

$$\left\| \begin{bmatrix} W_{perf} S_{i,D} \\ W_{ro}(I - S_{i,D}) \end{bmatrix} \right\|_{\infty} < 1, \text{ when } ny < nu$$

in which the frequency crossover band is defined as occurring in an interval $\omega_c = \omega_{Low}, \omega_{high}$, and in which $$(I - L)^{-1} = \begin{bmatrix} S_o & GS_i = S_o G \\ S_i C = CS_o & S_i \end{bmatrix},$$

$$S_o = (I - GC)^{-1}, S_i = (I - CG)^{-1}$$

$$L = \begin{bmatrix} 0 & G \\ C & 0 \end{bmatrix}$$

and using the notation
$S_{i,D} = D_i^{-1} S_i D_i$
$S_{o,D} = D_o^{-1} S_o D_o$
$W_{perf}(s) \equiv \omega_1/s$
$W_{ro}(s) \equiv s/\omega_2$ where ny represents a number of measurement signals in measurement signal 315 and nu represents a number of control signals in control signal 327.

The performance, rolloff, and stability objectives, as discussed above, may be used to define constraints that are based on the frequency crossover band. Additional constraints, such as those related to setpoint tracking and/or disturbance rejection goals, may be similarly expressed as H∞ constraints on a closed-loop transfer function. TCE 120 may combine all of the requirement constraints to optimize the tunable parameters.

Process 400 may further include outputting the tuned parameters (block 460). In one implementation, the values corresponding to the tuned parameters may be output to the user or to a file. Alternatively or additionally, the tuned parameter values may directly or automatically incorporated into model 300.

An example of the application of process 400, to optimize the tunable parameters for a model, will next be described with reference to FIGS. 5-7.

Figure 5:
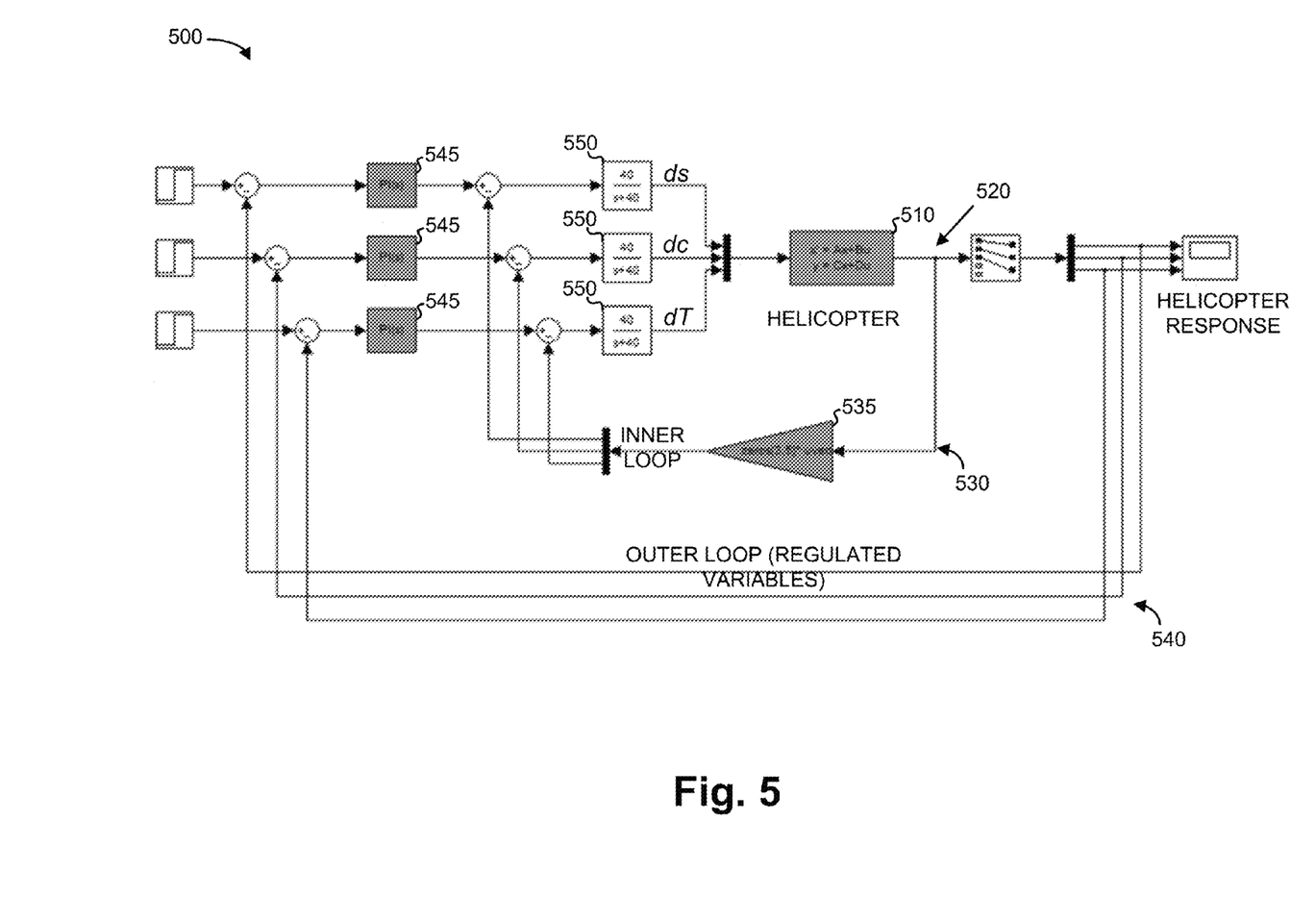
FIG. 5 is a diagram illustrating an example of a fixed-structure control system with multiple loops and multiple fixed-structure control elements to be tuned.

FIG. 5 is a diagram illustrating an example of a model 500. Model 500 may include, for instance, a model that is created with a graphical interface of TCE 120. As shown, model 500 includes a number of graphical elements, referred to as blocks herein. Each of the blocks may represent functionality and/or data. In this example, model 500 may correspond to a model developed to control a hovering helicopter.

In model 500, block 510 may model the operation of the helicopter. Three control signals, $d_s$, $d_c$, and $d_T$ may represent commands that are used to control the helicopter. For example, the control signals $d_s$, $d_c$, and $d_T$ may specify angles or rates by which rotors, modeled in block 510, are to be adjusted. Collectively, these signals may represent the plant control signal 325. Block 510 may output measured values 520 (corresponding to measured signal 315 in FIG. 3). Measured values 520 may include a pitch angle, a roll angle, a roll rate, a pitch rate, and a yaw rate.

The controller structure of model 500 is illustrated as two feedback loops: inner loop 530 and outer loop 540. Inner loop 530 may be a static output feedback (SOF) loop that provides stability augmentation and decoupling. Inner loop 530 may include a five-input (pitch angle, roll angle, roll rate, pitch rate, and yaw rate) amplifier block 535 that provides three output static feedback gain values. Outer loop 540 may use three of the five measured values (pitch, angle, roll angle, and roll rate) to control three respective PID controllers 545. Output values of PID controllers 545 may be summed with output values of amplifier block 535, which may be filtered by roll-off filters 550 to obtain the control signals $d_s$, $d_c$, and $d_T$.

Amplifier block 535 and PID controllers 545 may represent the tunable elements in model 500. The total number of tunable parameters may be relatively large. For example, amplifier block 535 and PID controllers 545 may be associated with 21 parameters that may need to be tuned.

Figure 6:
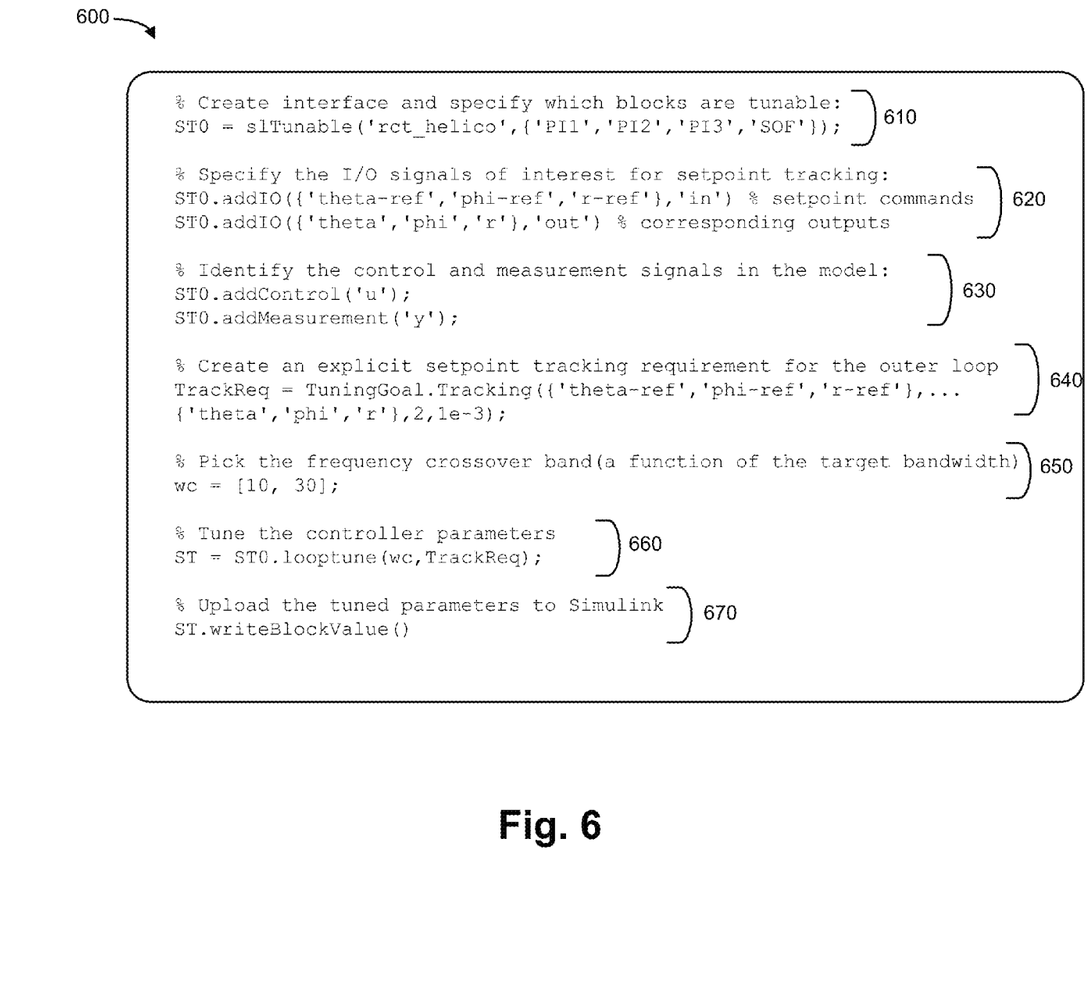
FIG. 6 is a diagram illustrating an example interface illustrating commands that may be used to control a TCE to optimize the tunable parameters of a model.

FIG. 6 is a diagram illustrating an example interface 600 illustrating commands that may be used to control TCE 120 to optimize the tunable parameters of model 500. In this example, interface 600 is a text-based interface. Alternatively or additionally, a graphical menu-based interface may be used to interact with TCE 120 to optimize the tunable parameters of model 500.

At some point, the user may wish to optimize the tunable parameters of amplifier block 535 and PID controllers 545. Through TCE 120, the user may specify model 500 and indicate which blocks in model 500 are tunable (blocks 410 and 430, FIG. 4). The user may correspondingly enter the command "slTunable" 610, which may create an H∞ optimization interface. As parameters for this command, the user may enter the name of the model (e.g., the file name "rct_helico") and labels identifying the tunable elements, such as the labels "PI1," "PI2," "PI3," and "SOF," which may correspond to amplifier block 535 and PID controllers 545.

The user may next identify signals in model 500 that may be of interest as input/output signals for setpoint tracking. In this example, commands 615 ("addIO") are used to identify input/output signals of interest.

The user may next identify the boundary points for model 500, which may effectively identify the plant 310 and controller 320 portions of model 500 (block 410, FIG. 4). In this example, plant 310 portion of model 500 and controller 320 portion of model 500 may be identified based on identification of control signal 325 and measurement signal 315. Commands 630 ("addControl" and "addMeasurement") are illustrated as example commands that specify control signal 325 (signal "u," which may correspond to the signals ds, dc, and dTin model 500) and measurement signal 315 (signal "y," which may correspond to the signals output from block 510). From control signal 325 and measurement signal 315, the boundary points, between plant 310 and controller 320 portions of model 500, may be identified.

In this example, assume that the user specifies the requirement constraints (block 420, FIG. 4) by specifying an explicit setpoint tracking requirement and by specifying the gain crossover region for the multivariable open-loop response (i.e., the user specifies the frequency crossover band). Command 640 illustrates an example command ("TuningGoal.Tracking") that may be used to set a setpoint tracking requirement and command 650 illustrates a command to set a range value for the frequency crossover band.

Figure 7:
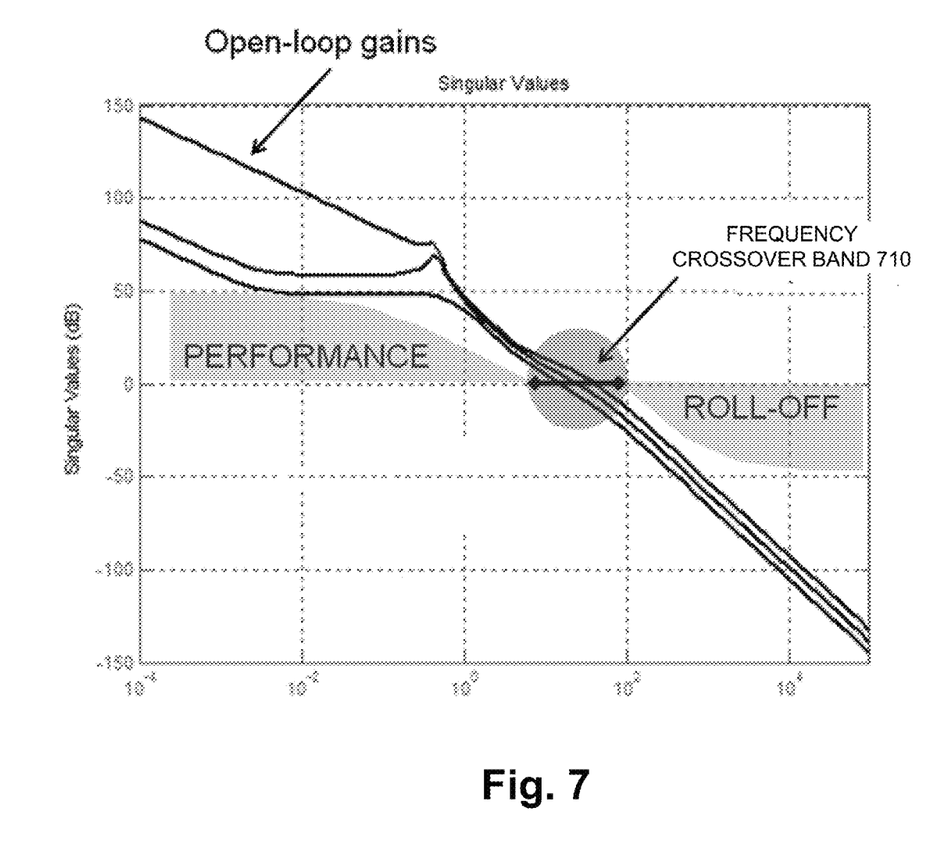
FIG. 7 is a diagram illustrating an example of desired open-loop frequency responses that should be provided by the tuned controller.

FIG. 7 is a diagram illustrating an example of desired open-loop frequency responses that may be provided by controller 320. In FIG. 7, singular value gains are shown on the vertical axis and frequency on the horizontal axis. Frequency crossover band 710 is illustrated as band 710. Frequencies below band 710 may be in the performance region of the controller, where it may be desirable for controller 320 to have relatively high gain. Frequencies above band 710 may be the rolloff region of controller 320, where it may be desirable to have low gain. Thus, relative to band 710, controller 320 may exhibit high gain at low frequencies, which may reject signal disturbances and follow setpoint changes, and exhibit low gain at high frequencies, which may guard against unmodeled dynamics and measurement noise.

Referring back to FIG. 6, command 660 ("ST0.looptune") may cause the setpoint tracking requirement and the frequency crossover band requirement to be input to the Hoc optimization interface and tuning of model 500 may be implemented. In one implementation, the "looptune" command (command 660) may automatically tune the tunable parameters of model 500. A syntax for this command may be:

ST=ST0.looptune(wc, Req1, Req2, . . . ), whereST0 represents the control system before tuning in the standard form of FIG. 3, ST represents the control system after tuning and contains the tuned parameter values, ;wc represents the frequency crossover band; and Req1 and Req2 represent optional additional supplied requirement constraints.

Command 670 ("ST.WriteBlockValue") may upload the new (tuned) parameter values to model 500.

With the Hoc optimization techniques described herein, a user, such as a designer of a controller, can perform Hoc optimization using tools that require relatively little technical understanding of Hoc optimization techniques. In particular, a user may need only a basic understanding of the frequency domain notations such as bandwidth, gains, and open-loop response. Further, the techniques described herein may advantageously enforce stability margins and automatically handle subtle signal scaling issues.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, implemented by at least one device, the method comprising:
    receiving a model including a plant portion that models elements that are to be controlled and a controller portion that models elements used to control the plant portion, the plant and controller portions of the model interacting with each other in a multi-input, multi-output (MIMO) feedback loop configuration, where the receiving is performed by the at least one device;
    receiving an identification of tunable elements of the controller portion of the model, where the tunable elements are associated with adjustable parameters relating to an operation of the tunable elements, and where the receiving the identification of the tunable elements is performed by the at least one device;
    receiving one or more requirements, relating to constraints of open or closed loop transfer functions;
    calculating, using non-smooth H-infinity optimization techniques, values for the adjustable parameters of the tunable elements, the calculating being based on: the model, the identification of the tunable elements, and the one or more requirements, and where the calculating is performed by the at least one device; and
    outputting the values for the adjustable parameters.

2. The method of claim 1, where the constraints describe one or more of:
    a frequency crossover band of the open or closed loop transfer functions,
    setpoint tracking and disturbance rejection goals, or
    an identification of a particular shape of a gain function of an open loop response of the model.

3. The method of claim 2, where receiving the one or more requirements includes:
    receiving the frequency crossover band as a frequency range that marks a transition between actively controlled and uncontrolled frequencies of the model.

4. The method of claim 2, where calculating the values for the adjustable parameters of the tunable elements further includes:
    enforcing performance requirements, with respect to the MIMO feedback loop, to provide relatively high gains at frequencies below the frequency crossover band; and
    enforcing rolloff requirements, with respect to the MIMO feedback loop, to provide relatively low gains at frequencies above the frequency crossover band.

5. The method of claim 4, where enforcing the performance and rolloff requirements includes:
    adjusting the values for the adjustable parameters to enforce constraints.

6. The method of claim 1, where calculating the values for the adjustable parameters of the tunable elements further includes:
    enforcing robust stability of the MIMO feedback loop to sustain typical amounts of gain and phase variations at inputs and outputs to the first portion of the model.

7. The method of claim 6, where enforcing robust stability with respect to the MIMO feedback loop includes:

calculating the values for the adjustable parameters of the tunable elements to obtain robust stability.

8. The method of claim 1, further comprising:
receiving the model of the plant portion and the controller portion in a block diagram form;
receiving an identification of control signals in the model, where the control signals represent signals produced by the controller portion of the model to control the plant portion of the model;
receiving an identification of measurement signals in the model, where the measurement signals represent outputs of the plant portion that are consumed by the controller portion;
determining boundary points between the plant and controller portion based on the identification of the control signals and the measurement signals; and
receiving the one or more requirements, relating to constraints of the open loop transfer functions, at the boundary points.

9. The method of claim 1, further comprising:
receiving an identification of tunable elements of the plant portion of the model, the H-infinity optimization techniques being calculated additionally based on the identification of tunable elements of the plant portion of the model.

10. A non-transitory computer-readable medium storing instructions, the instructions comprising:
one or more instructions, which when executed by one or more processors, cause the one or more processors to receive a model including a plant portion that models elements that are to be controlled and a controller portion that models elements used to control the plant portion, the plant and controller portions of the model interacting with each other in a multi-input, multi-output (MIMO) feedback loop configuration;
one or more instructions, which when executed by the one or more processors, cause the one or more processors to receive an identification of tunable elements of the controller portion of the model, where the tunable elements are associated with adjustable parameters relating to an operation of the tunable elements;
one or more instructions, which when executed by the one or more processors, cause the one or more processors to receive one or more requirements, relating to constraints of open or closed loop transfer functions;
one or more instructions, which when executed by the one or more processors, cause the one or more processors to calculate, using non-smooth H-infinity optimization techniques, values for the adjustable parameters of the tunable elements, the calculating being based on: the model, the identification of the tunable elements, and the one or more requirements; and
one or more instructions, which when executed by the one or more processors, cause the one or more processors to output the values for the adjustable parameters.

11. The computer-readable medium of claim 10, where the constraints describe one or more of:
a frequency crossover band of the open or closed loop transfer functions,
setpoint tracking and disturbance rejection goals, or
an identification of a particular shape of a gain function of an open loop response of the model.

12. The computer-readable medium of claim 11, further comprising:
one or more instructions, which when executed by the one or more processors, cause the one or more processors to receive the frequency crossover band as a frequency range that marks a transition between actively controlled and uncontrolled frequencies of the model.

13. The computer-readable medium of claim 11, where the one or more instructions to calculate the values for the adjustable parameters of the tunable elements further include:
one or more instructions to enforce performance requirements, with respect to the MIMO feedback loop, to provide relatively high gains at frequencies below the frequency crossover band; and
one or more instructions to enforce rolloff requirements, with respect to the MIMO feedback loop, to provide relatively low gains at frequencies above the frequency crossover band.

14. The computer readable medium of claim 13, where the one or more instructions to enforce the performance and rolloff requirements further include:
one or more instructions to adjust the values for the adjustable parameters to enforce constraints.

15. The computer-readable medium of claim 10, where the one or more instructions to calculate the values for the adjustable parameters of the tunable elements further include:
one or more instructions to enforce robust stability of the MIMO feedback loop to sustain typical amounts of gain and phase variations at inputs and outputs to the first portion of the model.

16. The computer-readable medium of claim 15, where the one or more instructions to enforce robust stability with respect to the MIMO feedback loop further include:
one or more instructions to calculate the values for the adjustable parameters of the tunable elements to obtain robust stability.

17. The computer readable medium of claim 10, further comprising:
one or more instructions to receive the model of the plant portion and the controller portion in a block diagram form;
one or more instructions to receive an identification of control signals in the model, where the control signals represent signals produced by the controller portion of the model to control the plant portion of the model;
one or more instructions to receive an identification of measurement signals in the model, where the measurement signals represent outputs of the plant portion that are consumed by the controller portion;
one or more instructions to determine boundary points between the plant and controller portion based on the identification of the control signals and the measurement signals; and
one or more instructions to receive the one or more requirements, relating to constraints of the open loop transfer functions, at the boundary points.

18. The computer readable medium of claim 10, further comprising:
one or more instructions to receive an identification of tunable elements of the plant portion of the model, the H-infinity optimization techniques being calculated additionally based on the identification of tunable elements of the plant portion of the model.

19. A computing device comprising:
a memory to store instructions; and
one or more processors, to execute the instructions, to:
receive a model including a plant portion that models elements that are to be controlled and a controller portion that models elements used to control the plant portion, the plant and controller portions of the model interacting with each other in a multi-input, multi-output (MIMO) feedback configuration;

receive an identification of tunable elements of the model, the tunable elements being associated with adjustable parameters relating to an operation of the tunable elements;

receive one or more requirements, relating to constraints of open loop transfer functions, where the constraints are described by a frequency crossover band that marks a transition between actively controlled and uncontrolled frequencies of the model;

calculate, using non-smooth H-infinity optimization techniques, values for the adjustable parameters of the tunable elements, the calculating being based on: the model, the identification of the tunable elements, and the one or more requirements, and the calculating being performed to:

enforce robust stability of the MIMO feedback configuration to sustain typical amounts of gain and phase variations at inputs and outputs to the plant portion of the model,     enforce performance requirements, with respect to the MIMO feedback configuration, to provide relatively high gains at frequencies below the frequency crossover band, and     enforce rolloff requirements, with respect to the MIMO feedback loop, to provide relatively low gains at frequencies above the frequency crossover band; and output the values for the adjustable parameters.

20. The device of claim 19, where the processor further executes instructions to:

receive the model of the plant portion and the controller portion in a block diagram form;

receive an identification of control signals in the model, where the control signals represent signals produced by the controller portion of the model to control the plant portion of the model;

receive an identification of measurement signals in the model, where the measurement signals represent outputs of the plant portion that are consumed by the controller portion;

determine boundary points between the plant portion and the controller portion based on the identification of the control signals and the measurement signals; and     receive the one or more requirements, relating to constraints of the open loop transfer functions, at the boundary points.

21. The device of claim 19, where the processor further executes instructions to: calculate the values for the adjustable parameters of the tunable elements to obtain robust stability.

22. The device of claim 19, where the processor further executes instructions to:

adjust the values for the adjustable parameters to enforce constraints.

* * * * *

UNITED STATES PATENT AND TRADEMARK OFFICE
CERTIFICATE OF CORRECTION

PATENT NO. : 9,158,291 B1  
APPLICATION NO. : 13/456698  
DATED : October 13, 2015  
INVENTOR(S) : Pascal Gahinet Page 1 of 1

It is certified that error appears in the above-identified patent and that said Letters Patent is hereby corrected as shown below:

IN THE CLAIMS

Please correct Claim 6 as follows:

Column 12, line 65, after "outputs to" delete "the".
Column 12, line 65, after "outputs to" insert -- a --.

Please correct Claim 15 as follows:

Column 14, line 24, after "outputs to" delete "the".
Column 14, line 24, after "outputs to" insert -- a --.

Signed and Sealed this
Fifteenth Day of March, 2016

Michelle K. Lee
*Director of the United States Patent and Trademark Office*